United States Patent
Duncan et al.

(10) Patent No.: US 7,158,700 B2
(45) Date of Patent: Jan. 2, 2007

(54) FIBER-OPTIC TRANSCEIVER

(75) Inventors: Michael P. Duncan, Pulaski, VA (US);
Kanwai P. Lo, Blacksburg, VA (US);
Larry D. Vaught, Pembroke, VA (US);
Barry K. Witherspoon, Blacksburg, VA (US)

(73) Assignee: Moog Inc., East Aurora, NY (US)

( * ) Notice: Subject to any disclaimer, the term of this patent is extended or adjusted under 35 U.S.C. 154(b) by 293 days.

(21) Appl. No.: 10/845,633

(22) Filed: May 14, 2004

(65) Prior Publication Data

US 2005/0254822 A1    Nov. 17, 2005

(51) Int. Cl.
*G02B 6/26* (2006.01)
*G02B 6/36* (2006.01)

(52) U.S. Cl. .............................. 385/31; 385/49; 385/88
(58) Field of Classification Search ...................... None
See application file for complete search history.

(56) References Cited

U.S. PATENT DOCUMENTS

| | | | |
|---|---|---|---|
| 5,546,212 A * | 8/1996 | Kunikane et al. ........... 398/136 |
| 6,027,255 A * | 2/2000 | Joo et al. ........................ 385/88 |
| 6,353,491 B1 * | 3/2002 | Tanaka et al. ............... 398/139 |
| 6,626,584 B1 * | 9/2003 | Fujita et al. .................. 385/88 |
| 6,637,947 B1 * | 10/2003 | Melchior et al. .............. 385/88 |
| 6,694,074 B1 * | 2/2004 | Schunk ......................... 385/33 |
| 6,793,406 B1 * | 9/2004 | Edwards et al. .............. 385/88 |
| 6,813,418 B1 * | 11/2004 | Kragl ........................... 385/49 |
| 6,899,469 B1 * | 5/2005 | Kobayashi et al. ........... 385/92 |
| 2002/0041731 A1 * | 4/2002 | Fujita et al. .................. 385/31 |
| 2003/0059178 A1 * | 3/2003 | Kobayashi et al. ........... 385/94 |

* cited by examiner

*Primary Examiner*—Sung Pak
(74) *Attorney, Agent, or Firm*—Phillips Lytle LLP

(57) ABSTRACT

A fiber optic transceiver (37) is adapted for use in transmitting and receiving optical signals in a fiber-optic network (30). The improved transceiver comprising: a multi-mode optical fiber (36) having a longitudinal axis (x—x) and having a proximal end (35). The fiber is adapted to convey optical signals in either direction therealong. A photodetector (32) is arranged in longitudinally-spaced relation to the fiber proximal end. The photodetector has a sensitive surface (34) operatively arranged to receive light energy exiting the fiber through the proximal end. A light source (31) is arranged between the fiber proximal end and the photodetector surface. The light source is arranged to selective emit light energy into the fiber through the proximal end.

31 Claims, 4 Drawing Sheets

FIBER-OPTIC TRANSCEIVER

TECHNICAL FIELD

The present invention relates generally to fiber-optic signal transmitting and receiving devices, and, more particularly, to improved fiber-optic transceivers that are adapted for use in transmitting and receiving optical signals in a fiber-optic network.

BACKGROUND ART

A device that is capable of both transmitting and receiving optical signals in a fiber-optic network is called a fiber-optic transceiver. There are two operational modes of communication in a bi-directional transceiver: the transmission (Tx) mode, and the reception (Rx) mode. In the Tx mode, a transmitter typically converts an electrical input signal to an optical signal by modulating a laser or light-emitting diode (LED) source. The optical signal is coupled to an optical fiber and transmitted to the optical fiber network. In the Rx mode, a receiver receives an optical signal from the optical network, and converts it into an electrical signal through the use of a photodetector. In a bi-directional transceiver, only one optical fiber is used for transmitting and receiving optical signals. The fiber is multiplexed in such a way that it can both accept the incoming optical signal from the distant optical source, as well as to carry the outgoing optical signal from the local source to the network.

Signal attenuation is commonly expressed in terms of its dimensionless decibel loss:

$$dB = -10 \log A/B$$

where A is the attenuated signal and B is the original signal. Thus, for example, if an attenuated signal is 50% of a transmitted signal, the foregoing equation would be:

$$dB = -10 \log 0.5/1.0 = -10 \log 0.5 = -3 \text{ dB}.$$

In other words, the loss of half of the original signal represents a −3 dB loss in signal strength.

Conventional methods of accomplishing bi-directional communications in an optical network typically use either a fiber-optic coupler or an optical beamsplitter. However, these methods have one common drawback, namely, that at least 50% of the optical power is typically lost in transmitting and receiving the optical signals. The losses occur because both the coupler and the beamsplitter are only partially transmissive or reflective. One can adjust the transmission ratio for the two fiber-optic branches in the coupler, or the transmittance and reflectance in the beamsplitter, but a theoretical loss of about −6 dB will occur.

To further understand the theoretical losses, assume that a light source has an optical power of 1 mw, and assume that each fiber-optic coupler or beamsplitter has a transmittance and reflectance of 0.5, and has no excess losses. In the transmission mode, only about 0.5 mw will be transmitted through the first coupler or beamsplitter to the outgoing fiber. As demonstrated above, this represents a total loss of about −3 dB. In the distant transceiver, the received signal will be further halved as it again passes through the second coupler or beamsplitter. This represents another loss of about −3 dB, and a total loss of −6 dB in passing through two couplers or beamsplitters. Thus, approximately 75% of the optical power is lost in communicating between two conventional transceivers. An additional −0.3 to −0.5 dB optical power is lost if excess losses are considered.

Accordingly, it would be generally desirable to provide an improved fiber-optic transceivers that may be used in an optical fiber network, and that have improved transmission and reception efficiencies.

DISCLOSURE OF THE INVENTION

The present invention relates to fiber-optic transceiver geometries that enable bi-directional optical communication over a single optical fiber. The focus of the present invention is on transceiver configurations and geometries that allow optical coupling from the light source to the optical fiber, and from the optical fiber to the photodetector. The invention provides an improvement over existing technologies. Light insertion losses and light reception losses are reduced. The cost of components is lowered, and the assembly labor is also reduced.

With parenthetical reference to the corresponding parts, portions or surfaces of the embodiment disclosed in FIGS. 3–5, merely for purposes of illustration and not byway of limitation, the present invention broadly provides an improved fiber-optic transceiver (37) that is adapted for use in transmitting and receiving optical signals in a fiber-optic network (30). The improved transceiver broadly comprises: a multi-mode optical fiber (36) having a longitudinal axis (x—x) and having a proximal end (35), the fiber being adapted to convey optical signals in either direction therealong; a photodetector (32) arranged in longitudinally-spaced relation to the fiber proximal end, the photodetector having a sensitive surface (34) operatively arranged to receive light energy exiting the fiber through the proximal end; and a light source (31) arranged between the fiber proximal end and the photodetector surface, the light source being operatively arranged to selectively emit light energy into the fiber through the proximal end.

In one form, the projected longitudinal axis of the fiber at the proximal end may be substantially aligned with the center of the photodetector surface. The light source may be an edge-emitting laser, a vertical cavity surface emitting laser (VCSEL), a light-emitting diode (LED), or some other light source.

The light source is arranged to shade a portion of the photodetector surface. As used herein, the word "shade" means to restrict the percentage of light (i.e., between 0% and 100%) that would be received but for the shading. Thus, if there is no shading, the amount of incident light received would be 100%. If a surface were totally shaded, the amount of light received thereby would be 0%. As used herein, shading represents a percentage of light received between and including these two extremes. In one form, the shaded portion of the photodetector surface is pie-shaped, and is less than about 25% of the sensitive area of the photodetector surface.

The invention may further comprise a submount (33) operatively arranged between the light source and the photodetector. This submount may be formed of an electrically-insulative and thermally-conductive material. The submount may be arranged to shade a portion of the photodetector surface. The submount may be arranged to support the light source. In one particular form, the submount has a V-shaped corner, and the light source is operatively arranged proximate this corner. Here again, the pie-shaped shaded portion of the photodetector surface may be less than about 25% of the sensitive area of the photodetector surface.

The light source insertion loss may be directly related to the radial distance by which the center of the light source is misaligned with the projected longitudinal axis of the fiber at the proximal end. The photodetector reception loss may be inversely related to this radial distance.

The invention may further comprise means for conveying heat from the light source. Heat may be either conducted, convected and/or radiated away from the heat source.

In one form, the fiber longitudinal axis at the proximal end is tilted at an angle θ with respect to the light source. In this arrangement, the invention may further include a focusing lens (e.g., 44 in FIG. 6) operatively arranged between the light source and the fiber proximal end for focusing light energy emitted from the light source into the fiber proximal end. The fiber proximal end may be tilted at the same projected angle with respect to the focusing lens as it is with respect to the light source.

In one particular form, the sum of the light source insertion losses and photodetector reception loss is about −1.4 dB when the tilt angle is about 6°. More particularly, in this arrangement, the light source insertion loss is about −0.4 db, and the photodetector reception loss is about −1.0 dB, when the projected longitudinal axis of the fiber is misaligned with the center of the photodetector surface by a distance of about 0.12 mm.

In other form, the light source is tilted at an angle θ with respect to the fiber longitudinal axis at the proximal end. This form may further include a focusing lens (e.g., 54 in FIG. 7) that is operatively arranged between the light source and the fiber proximal end for focusing light energy emitted from the light source into the fiber proximal end. The light source and the focusing lens may be both tilted at the same angle with respect to the fiber longitudinal axis at the proximal end.

In one particular form, the sum of the light source insertion loss and the photodetector reception loss is about −1.1 dB when the tilt angle is about 6°. More particularly, the light source insertion loss is about −0.5 dB, and the photodetector reception loss is about −0.6 dB at this tilt angle when the projected longitudinal axis of the fiber is misaligned with the center of the photodetector sensitive surface by a distance of about 0.14 mm. As indicated above, the tilt angle may be about 6°, but may encompass the range of from 4° to about 14°.

The photodetector reception loss varies directly with the displacement of the projected longitudinal axis of the fiber at the proximal end from the center of the photodetector surface. However, the light source transmission loss does not vary substantially with such displacement.

Accordingly, the general object of this invention is to provide an improved transceiver coupling to an optical fiber.

Another object is to provide an improved fiber-optic transceiver that is particularly adapted for use in transmitting and receiving optical signals in a fiber-optic network.

Another object is to provide an improved fiber-optic transceiver having reduced light source insertion losses and photodetector reception losses.

Another object is to provide an improved fiber-optic transceiver in which the cost of the various components is lowered, and the assembly labor is reduced.

These and other objects and advantages will become apparent from the foregoing and ongoing written specification, the drawings, and the appended claims.

DESCRIPTION OF THE PREFERRED EMBODIMENTS

Figure 1:
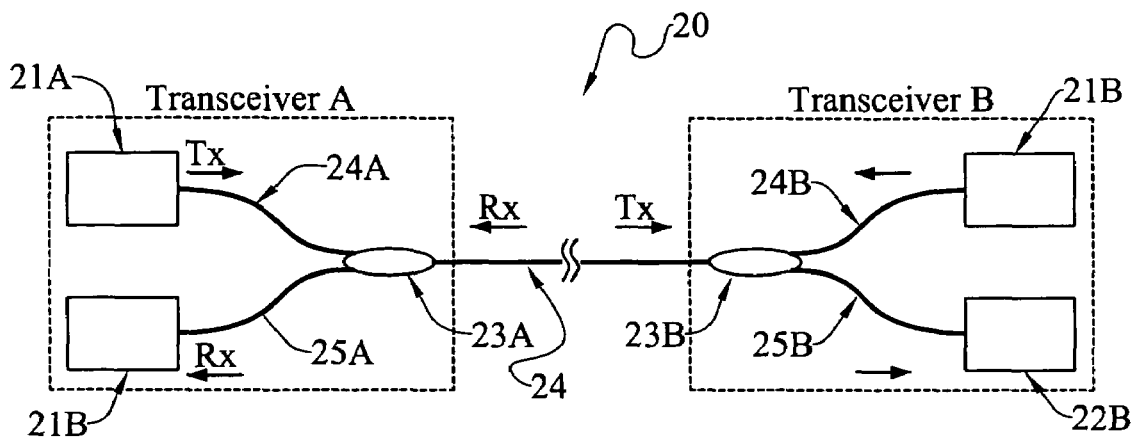
FIG. 1 is a schematic view of a prior art bi-directional communication system in which each transceiver has a fiber-optic coupler.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly, to FIG. 1 thereof, a prior art fiber-optic network is generally indicated at 20. In this network, a fiber-optic transceiver A is arranged to transmit and receive optical signals with respect to a fiber-optic transceiver B. Transceiver A is shown as including a light source 21A, a photodetector 22A, and a fiber-optic coupler 23A. A multi-mode optical fiber 24 is arranged to convey optical signals in either direction between transceivers A and B. Similarly, transceiver B is shown as including a light source 21B, a photodetector 22B, and a fiber-optic coupler 23B, which communicates with multi-mode fiber 24.

For example, light source 21 A may transmit an optical signal which is transmitted along optical path 24A to fiber-optic coupler 23A, for insertion into a multi-mode optical fiber 24. This optical signal is transmitted along fiber 24 to fiber optic coupler 23B, where the signal is provided via optical path 25B to photodetector 22B. Conversely, optical light source 21B might selectively emit light into an optical path 24B which communicates with a fiber optic coupler 23B for transmission along multi-mode fiber 24. In fiber-optic coupler 23A, the received signal is sent via optic path 25A to photodetector 22A.

Thus, FIG. 1 discloses two fiber-optic transceivers coupled together via an optical fiber 24. Each transceiver in FIG. 1 is shown as having a fiber-optic coupler.

Figure 2:
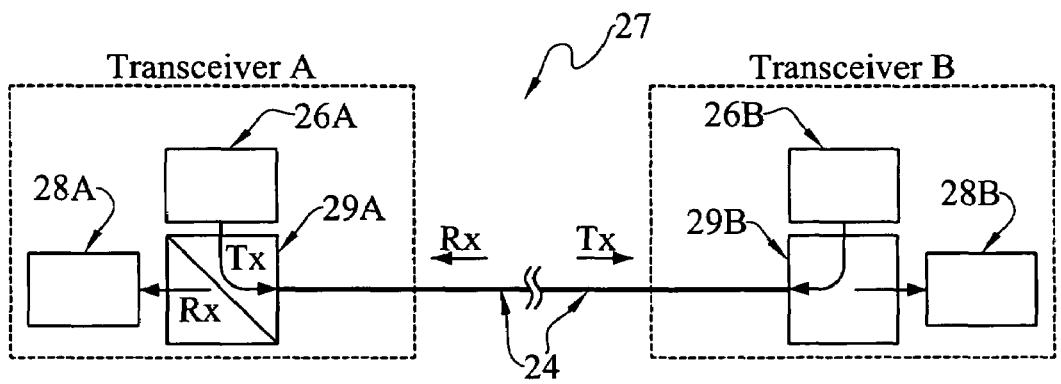
FIG. 2 is a schematic view of a prior art bi-directional communication system in which each transceiver has a beamsplitter.

FIG. 2 is a schematic of another prior art network 27 having a transceiver A arranged to transmit signals to and from a like transceiver B. Here again, the same reference numerals are used to identify the corresponding parts, portions or surfaces of each transceiver, with the suffix letters "A" and "B" being used to identify the respective parts or portions of each transceiver. In this arrangement, light source 26A is arranged to transmit light to beamsplitter 29A. A portion of the light is emitted to optical fiber 24, and is submitted along the length thereof to a beamsplitter 29B, where a received signal Rx is transmitted to photodetector 28B. Conversely, light emitted from source 26B is provided to beamsplitter 29B, and is transmitted via optical fiber 24 to beamsplitter 29A. The received signal is then transmitted to photodetector 28A.

As indicated above, the problem with these prior art arrangements shown in FIGS. 1 and 2 is that there is substantial attenuation of the optical signals transmitted through the optical coupler 23 or the beamsplitter 29. This causes high light insertion losses and high photodetector reception losses. To transmit a signal from transceiver A to transceiver B could result in a theoretical loss on the order of about −6 dB, with losses of about −3 dB occurring each time the signal passes though a fiber-optic coupler or beamsplitter.

Figure 3:
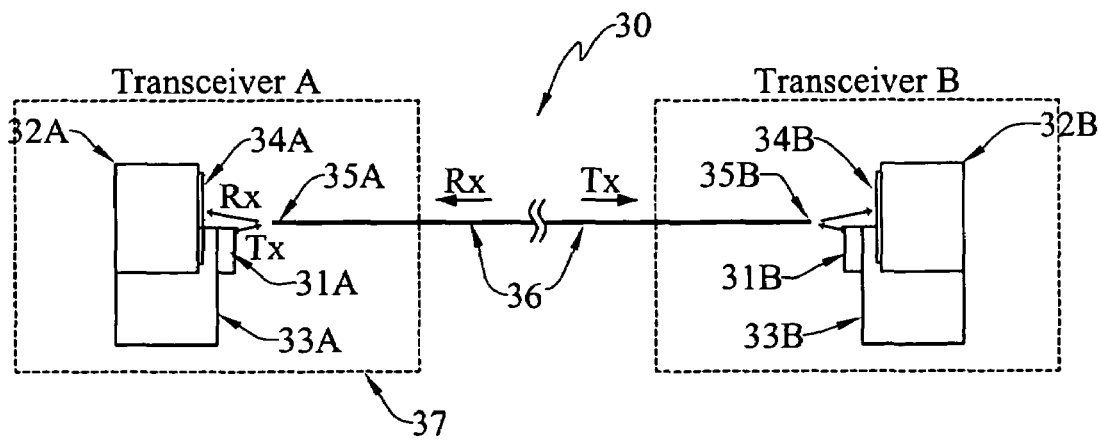
FIG. 3 is a schematic view of an improved fiber-optic network employing one form of the improved fiber-optic transceiver disclosed herein.

FIG. 3 is a schematic view of another fiber-optic network, indicated at 30, that includes improved transceivers A and B, indicated at 37, according to the present invention. Transceiver A is shown as including a VCSEL light source 31A, and photodetector 32A. A submount or heat sink 33A is operatively arranged between the sensitive area 34A of the photodetector and the light source. This heat sink not only supports the light source, but is electrically insulative and thermally conducting. Heat sink 33A functions to conduct heat away from the source. The light source 31A is shown as being misaligned with respect to the proximal end 35A of optical fiber 36. In other words, the heat sink and light source are operatively arranged in the path of light launched from proximal end 35A onto the photodetector.

Transceiver B has the corresponding parts previously described, albeit individually identified with the suffix B.

Thus, the light source 31A of transceiver A is operatively arranged to selectively emit an optical signal which is launched into the proximal end 35A of fiber 36. This signal is transmitted along fiber 36, and is launched from fiber distal end 35B onto photodetector active surface 34B. Conversely, light source 31B is arranged to selectively emit an optical signal which is adapted to be launched into proximal end 35B of fiber 36. This signal may be transmitted along fiber 36 and is arranged to be launched from fiber distal end 35A onto photodetector active surface 34A. It should be noted that in this arrangement, the light source and/or heat sink is operatively arranged to at least partially shade a portion of the photodetector active region.

Figure 4:
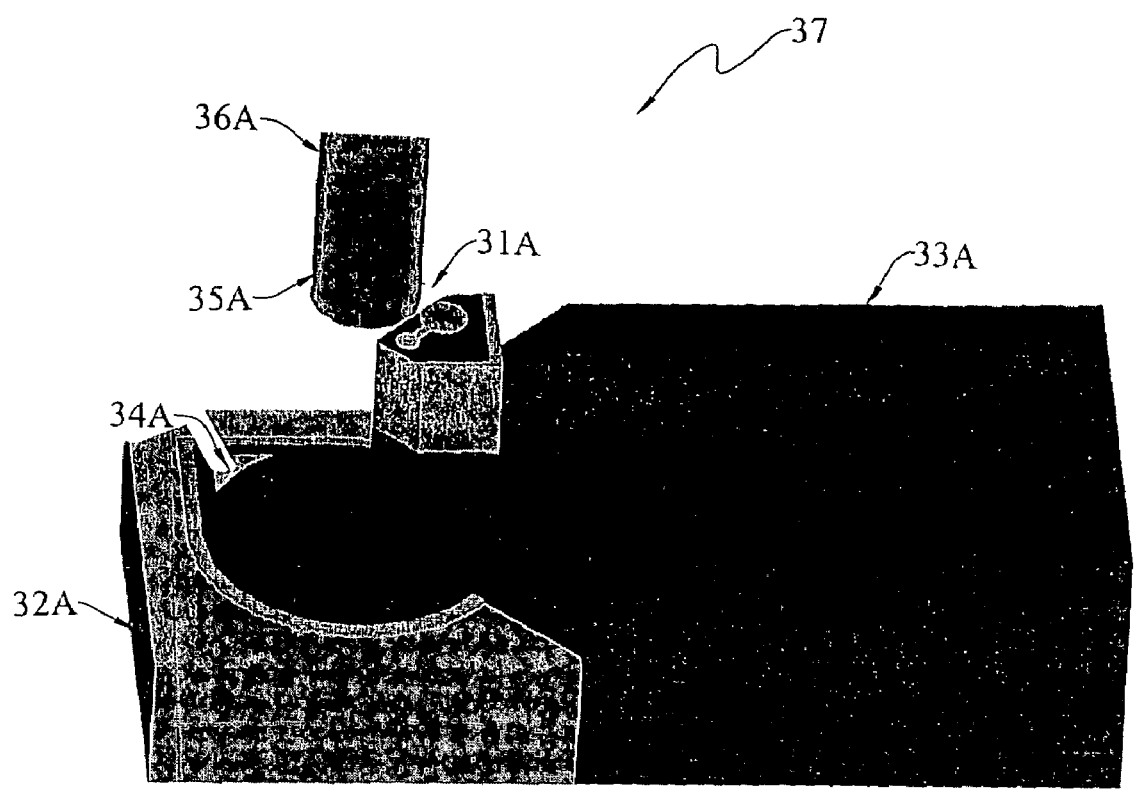
FIG. 4 is a perspective view of the fiber-optic transceiver shown in FIG. 3, this view showing the fiber, the light source, the submount and the photodetector.
Figure 5:
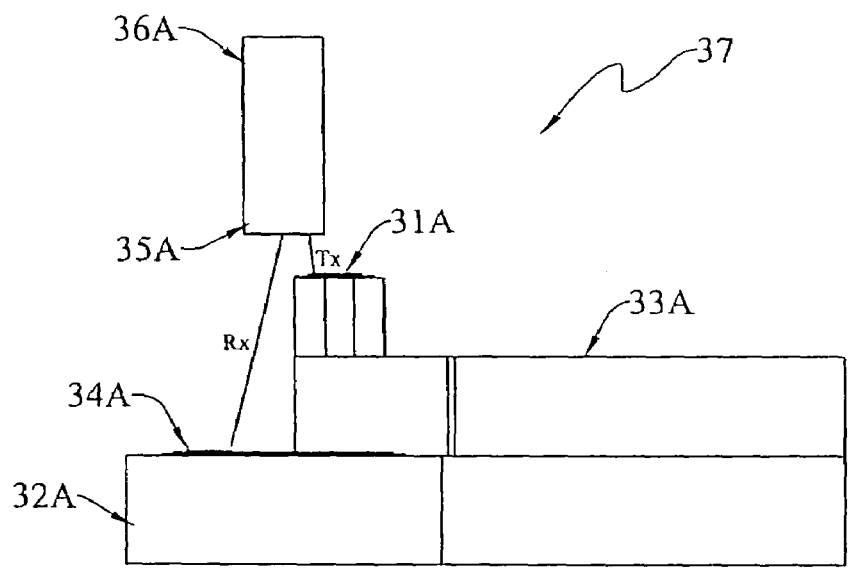
FIG. 5 is a side elevation of the transceiver shown in FIG. 4.

FIGS. 4 and 5 are schematic perspective and side elevational views of transceiver A in FIG. 3. In FIGS. 4 and 5, fiber 36 is shown as having a proximal end 35A operatively arranged in spaced relation to the sensitive circular surface 34A of photodetector 32A. The heat sink or submount 32A has a V-shaped corner shading a portion of photodetector sensitive surface 34A. The light source 31A is mounted on, and is supported by, submount 33A proximate this corner. Light source 31A is arranged to emit light into the proximal end 35A of fiber 36.

Figure 6:
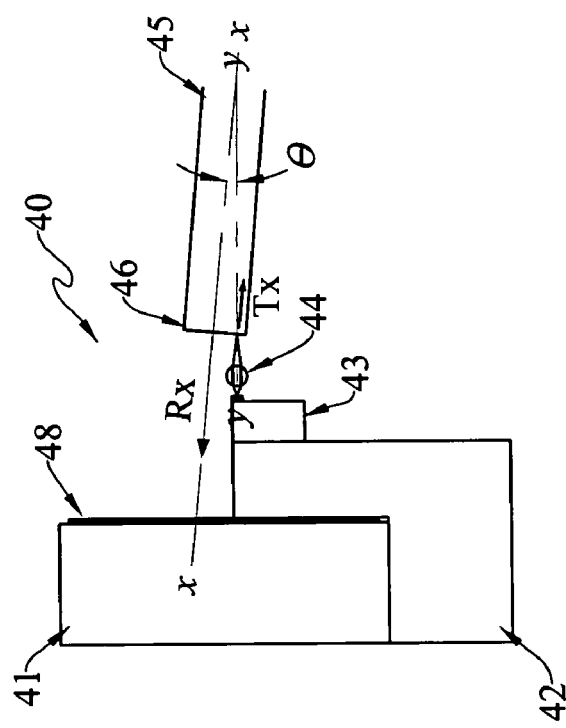
FIG. 6 is a schematic showing an improved fiber-optic transceiver configuration in which the fiber is tilted with respect to the light source and focusing lens.

FIG. 6 is a further enlarged schematic view of another transceiver configuration, generally indicated at 40, having a photodetector 41, a heat sink 42, a light source 43, and a focusing lens 44. A optical fiber 45 has its proximal end 46 arranged in spaced relation to the light source 43 and to the sensitive area 48 of the photodetector. In this case, the projected longitudinal axis (x—x) of the optical fiber at the proximal end is tilted at an angle θ with respect to the centerline (y—y) of circular photodetector surface 48. Light source 43 is arranged to transmit light through focusing lens 44 into the open proximal end 46 of fiber 45.

Figure 7:
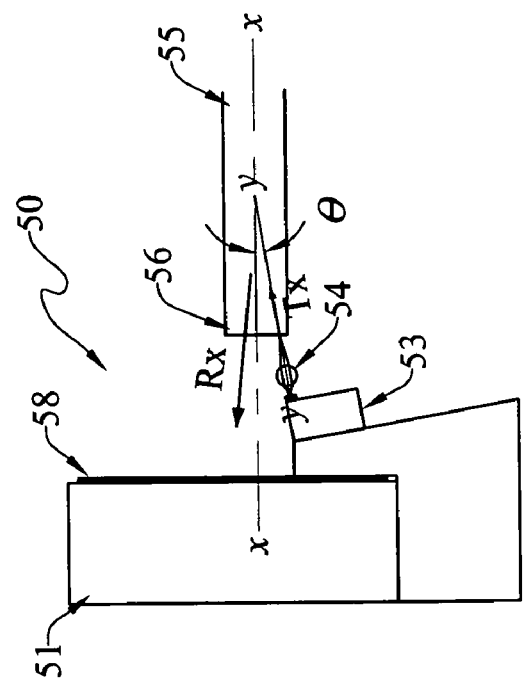
FIG. 7 is a schematic of another improved fiber-optic transceiver in which the light source and focusing lens are tilted with respect to the proximal end of the receiving fiber.

FIG. 7 is a schematic view of an alternative transceiver, generally indicated at 50. Transceiver 50 is shown as having a photodetector 51, a heat sink 52, a light source 53, a focusing lens 54, an optical fiber 55 having a proximal end 56, and a sensitive circular area 58 on the photodetector. The proximal end 56 of fiber 55 is arranged in spaced relation to detector surface 58. In this arrangement, however, the light source and focusing lens are tilted at an angle θ with respect to the longitudinal axis of the optical fiber 55 at the receiving end.

Figure 8:
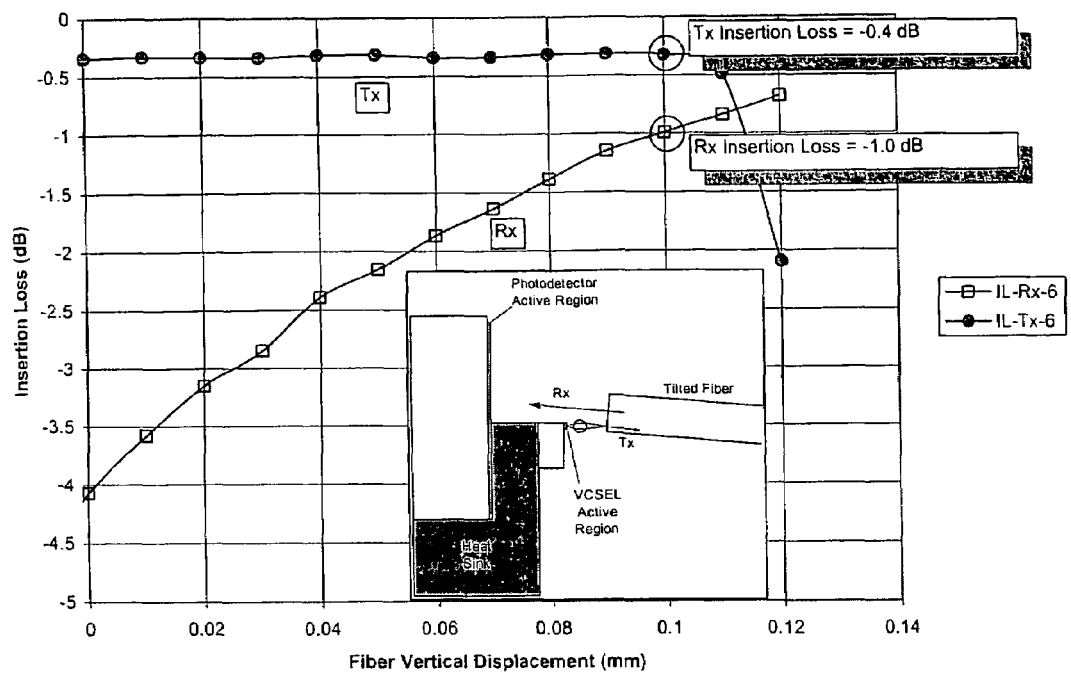
FIG. 8 is a graph showing optical signal attenuation (ordinate) vs. fiber displacement (abscissa) for the tilted-fiber arrangement shown in FIG. 6.
Figure 9:
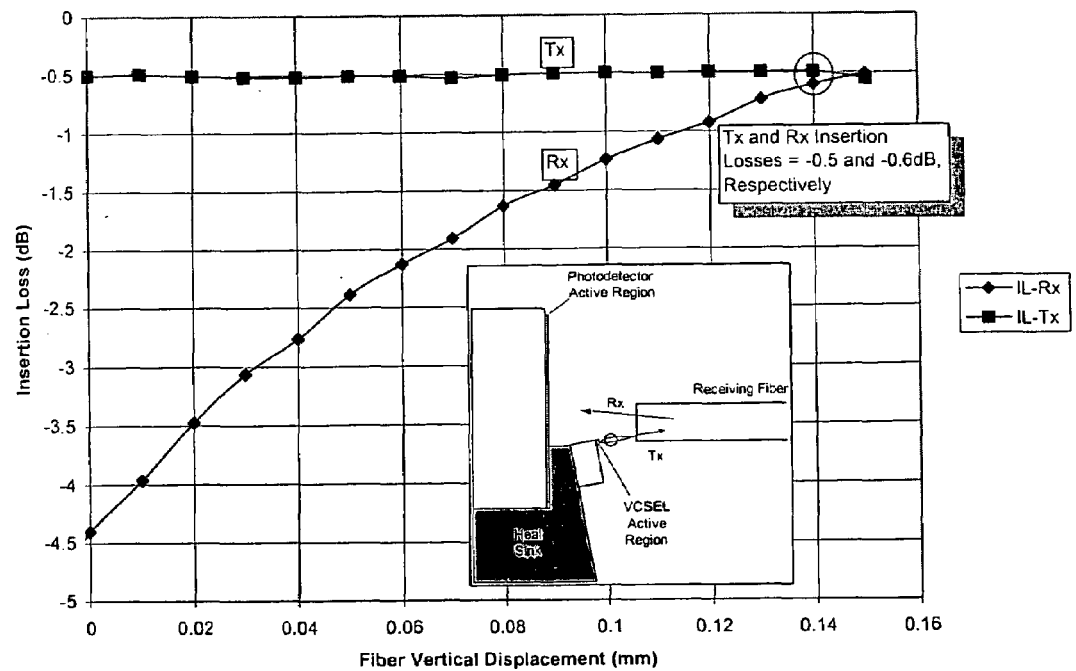
FIG. 9 is graph of optical signal attenuation (ordinate) vs. fiber displacement (abscissa) for the tilted-light-source-and-focusing-lens arrangement shown in FIG. 7.

FIGS. 8 and 9 are graphs showing optical signal loss or attenuation (ordinate) vs. fiber vertical displacement (abscissa) for the tilted-fiber and tilted-light-source-and-focusing-lens embodiments shown in FIGS. 6 and 7, respectively. In FIG. 8, it should be noted that the transmission or light insertion loss remains substantially constant, on the order of about −0.40 dB as the fiber displacement is varied between 0 and about 0.11 mm. However, for displacements greater than about 0.11 mm, the insertion loss increases greatly, reaching a loss of about −2.1 dB at a displacement of about 0.12 mm. The attenuation of the received signal varies directly, albeit non-linearly, with the fiber displacement. At a vertical displacement of about 0.10 mm, the transmission loss is about −0.4 dB, and the receiving loss is about −1.0 dB.

FIG. 9 shows the signal loss (ordinate) vs. fiber vertical displacement (abscissa) for the tilted-light-source-and-focusing-lens arrangement shown in FIG. 7. The transmission loss remains substantially constant, about −0.5 dB, as the fiber vertical displacement varies from 0 to about 0.14 mm, but does not increase sharply as displacement increases beyond about 0.11 mm. As expected, the reception loss varies directly with fiber vertical displacement. At a displacement of about 0.14 mm, the transmission loss is about −0.5 dB, and the reception loss is about −0.6 dB.

Thus, a comparison of the curves shown in FIGS. 8 and 9 will reveal that the attenuation is not simply a function of relative tilting between the light source and focusing lens, on the one hand, and the fiber on the other. More particularly, it would appear that the arrangement shown in FIG. 7 produces less attenuation than the arrangement shown in FIG. 6 as displacements are increased. For example, in both FIGS. 6 and 7, the respective tilt angles are about 6°. However, at a fiber vertical displacement of 0 mm, the light source insertion loss for the tilted fiber arrangement is about −0.40 dB, and the photodetector reception loss is about −4.05 dB. Thus, for a 0 mm displacement arrangement, the sum of these two losses is about −4.45 dB. With the tilted-source-and-focusing-lens arrangement shown in FIG. 7, at 0 mm, the light source insertion loss is about −0.5 dB, with the photodetector reception loss is about −4.4 dB, for a total of about −4.9 dB. However, as the fiber vertical displacement increases, the photodetector receiving loss in FIG. 9 appears to more closely approach the light source transmission loss, whereas the light source insertion loss in FIG. 8 increases sharply for displacements greater than about 0.11 mm.

Accordingly, the invention broadly provides an improved fiber-optic transceiver adapted for use in transmitting and receiving optical signals in a fiber-optic network. The improved transceiver includes: a multi-mode optical fiber having a longitudinal axis and having a proximal end, the fiber being adapted to convey optical signals in either direction therealong; a photodetector arranged in spaced relation to the fiber proximal end, the photodetector having a sensitive surface operatively arranged to receive light energy exiting the fiber through the proximal end; and a light source arranged between the fiber proximal end and the photodetector surface, the light source being arranged to selectively emit light energy into said fiber through the proximal end.

Modifications

The present invention expressly contemplates that many changes and modifications may be made. For example, the structure and configuration of the transceiver may be varied. It may be desirable to tilt the light source and focusing lens with respect to the proximal end of the optical fiber. Alternatively, the optical fiber may be tilted with respect to the light source and focusing lens. The photodetector may be, but need not necessarily be, circular. The heat sink may be a solid member in which heat is conveyed away from the light source by conduction. Still further, heat may be radiated away from the heat source.

Therefore, while several forms of the improved fiber optic transceiver have been shown and described, and certain modifications thereof discussed, persons skilled in this art will readily appreciate that various additional changes and modifications may be made without departing from the spirit of the invention, as defined and differentiated by the following claims.

What is claimed is:

1. A fiber-optic transceiver adapted for use in transmitting and receiving optical signals in a fiber-optic network, comprising:
   a multi-mode optical fiber having a longitudinal axis and having a proximal end, said fiber being adapted to convey optical signals in either direction therealong;
   a photodetector arranged in spaced relation to said fiber proximal end, said photodetector having a sensitive surface operatively arranged to recieve light energy exiting said fiber through said proximal end; and
   a light source arranged between said fiber proximal end and said photodetector surface, said light source being arranged to shade less than about 25% of the sensitive area of said photodetector surface, said light source being arranged to selectively emit light energy into said fiber through said proximal end.

2. A fiber-optic transceiver as set forth in claim 1 wherein the projected longitudinal axis of said fiber at said proximal end is substantially aligned with the center of said photodetector surface.

3. A fiber-optic transceiver as set forth in claim 1 wherein said light source is one of an edge-emitting laser, a vertical cavity surface emitting laser, and a light-emitting diode.

4. A fiber-optic transceiver as set forth in claim 1 and further comprising a submount arranged between said light source and said photodetector.

5. A fiber-optic transceiver as set forth in claim 4 wherein said submount is formed of an electrically-insulative material.

6. A fiber-optic transceiver as set forth in claim 4 wherein said submount is formed of a thermally-conductive material.

7. A fiber-optic transceiver as set forth in claim 4 wherein said submount is arranged to at least partially shade a portion of said photodetector surface.

8. A fiber-optic transceiver as set forth in claim 4 wherein said submount is arranged to support said light source.

9. A fiber-optic transceiver as set forth in claim 4 wherein said submount has a corner, and wherein said light source is arranged proximate said corner.

10. A fiber-optic transceiver as set forth in claim 7 wherein the shaded portion of said photodetector surface is less than about 25% of the sensitive area of said photodetector surface.

11. A fiber-optic transceiver as set forth in claim 1 wherein the light source insertion loss is directly related to the radial distance by which the light source is misaligned wit the projected longitudinal axis of said fiber at said proximal end.

12. A fiber-optic transceiver as set forth in claim 11 wherein said photodetector reception loss is inversely related to said radial distance.

13. A fiber-optic transceiver as set forth in claim 1 wherein the sum of the light source insertion loss and the photodetector reception loss is about −4 dB.

14. A fiber-optic transceiver as set forth in claim 1 and further comprising means for conveying heat from said light source.

15. A fiber-optic transceiver as set forth in claim 14 wherein heat is conducted away from said light source.

16. A fiber-optic transceiver as set forth in claim 14 wherein heat is convected away from said light source.

17. A fiber-optic transceiver as set forth in claim 14 wherein heat is radiated away from said light source.

18. A fiber-optic transceiver as set forth in claim 1 wherein said fiber longitudinal axis at said proximal end is tilted at an angle with respect to said light source.

19. A fiber-optic transceiver as set forth in claim 18 and further comprising a focusing lens operatively arranged between said light source and said fiber proximal end for focusing light energy emitted from said light source into said fiber proximal end, and wherein said fiber proximal end is tilted with at said angle with respect to said focusing lens.

20. A fiber-optic transceiver as set forth in claim 19 wherein the sum of the light source insertion loss and the photodetector reception loss is about −1.4 dB when said tilt angle is about 6°.

21. A fiber-optic transceiver as set forth in claim 20 wherein the light source insertion loss is about −0.4 dB and the photodetector reception loss is about −1.0 dB.

22. A fiber-optic transceiver as set forth in claim 20 wherein the projected longitudinal axis of said fiber is misaligned with the center of said photodetector surface by a distance of about 0.10 mm.

23. A fiber-optic transceiver as set forth in claim 1 wherein said light source is tilted at an angle with respect to said fiber longitudinal axis at said proximal end.

24. A fiber-optic transceiver as set forth in claim 23 and further comprising a focusing lens operatively arranged between said light source and said fiber proximal end for focusing light energy emitted from said light source into said fiber proximal end, and wherein said light source and said focusing lens are both tilted at said angle.

25. A fiber-optic transceiver as set forth in claim 24 wherein the sum of the light source insertion loss and the photodetector reception loss is about −1.1 dB when said tilt angle is about 6°.

26. A fiber-optic transceiver as set forth in claim 25 wherein said light source insertion loss is about −0.5 dB and said photodetector reception loss is about −0.6 dB.

27. A fiber-optic transceiver as set forth in claim 24 wherein said tilt angle is between about 4° and about 14°.

28. A fiber-optic transceiver as set forth in claim 27 wherein said tilt angle is about 6°.

29. A fiber-optic transceiver as set forth in claim 25 wherein the projected longitudinal axis of said fiber is misaligned with the center of said photodetector surface by a distance of about 0.14 mm.

30. A fiber-optic transceiver as set forth in claim 24 wherein the photodetector reception loss varies directly with the displacement of the projected longitudinal axis of said fiber at said proximal end from the center of said photodetector surface.

31. A fiber-optic transceiver as set forth in claim 30 wherein the light source transmission loss does not vary substantially with said displacement.

* * * * *